US009303171B2

(12) United States Patent
Virtanen

(10) Patent No.: US 9,303,171 B2
(45) Date of Patent: Apr. 5, 2016

(54) SELF-HEALING POLYMER COMPOSITIONS

(75) Inventor: Jorma Antero Virtanen, Las Vegas, NV (US)

(73) Assignee: Tesla Nanocoatings, Inc., Massillon, OH (US)

(*) Notice: Subject to any disclaimer, the term of this patent is extended or adjusted under 35 U.S.C. 154(b) by 782 days.

(21) Appl. No.: 13/423,479

(22) Filed: Mar. 19, 2012

(65) Prior Publication Data

US 2012/0235083 A1  Sep. 20, 2012

Related U.S. Application Data

(60) Provisional application No. 61/454,131, filed on Mar. 18, 2011.

(51) Int. Cl.
*H01B 1/12* (2006.01)
*C09D 7/12* (2006.01)
*B82Y 30/00* (2011.01)
*C09D 5/08* (2006.01)

(52) U.S. Cl.
CPC ............ *C09D 7/1291* (2013.01); *B82Y 30/00* (2013.01); *C09D 5/08* (2013.01); *C09D 7/1233* (2013.01); *C09D 7/1266* (2013.01)

(58) Field of Classification Search
CPC ..................................... H01B 1/02; H01B 1/12
USPC ............... 252/500–519.1, 519.3; 524/495; 977/743, 778, 788, 962
See application file for complete search history.

(56) References Cited

U.S. PATENT DOCUMENTS

| | | | |
|---|---|---|---|
| 3,859,228 A | 1/1975 | Morishita et al. |
| 4,324,717 A | 4/1982 | Layer |
| 4,463,118 A | 7/1984 | Evans et al. |
| 5,071,706 A | 12/1991 | Soper |
| 5,589,523 A | 12/1996 | Sawaoka et al. |
| 6,020,385 A | 2/2000 | Halle et al. |
| 6,235,856 B1 | 5/2001 | Hafner et al. |
| 6,261,871 B1 | 7/2001 | Langari et al. |
| 6,375,872 B1 | 4/2002 | Chao |
| 6,479,167 B2 | 11/2002 | Sumita et al. |
| 6,486,099 B2 | 11/2002 | Igari et al. |
| 6,500,564 B1 | 12/2002 | Shiobara et al. |

(Continued)

OTHER PUBLICATIONS

Lvov ("Halloysite Clay Nanotubes for Controlled Release of Protective Agents." ACSNano, 2(5), pp. 814-820, online May 27, 2008).*

(Continued)

*Primary Examiner* — Tri V Nguyen
(74) *Attorney, Agent, or Firm* — Emerson Thomson Bennett, LLC; Daniel A. Thomson

(57) ABSTRACT

This invention pertains to a composition that can be used to heal cracks in plastics and other substrates. In the present invention, a composition comprising nanotubes, healing agent(s), and end caps for the nanotubes may be used to heal crack(s) as they begin to occur. With the composition, the healing agent(s) are contained within the nanotubes, and a reaction releases the healing agent(s) after the end caps can be removed from the nanotubes. This invention also includes a method of preparing a composition for healing cracks in plastics and other substrates. For this method, the healing agent(s) are filled inside of the nanotubes, and then end caps are bound onto the ends of the nanotubes. After a reaction occurs to remove the end caps and release the healing agent(s), the cracks within the substrate may then be healed.

18 Claims, 2 Drawing Sheets

(56) References Cited

U.S. PATENT DOCUMENTS

| | | | |
|---|---|---|---|
| 6,518,330 B2 | 2/2003 | Sottos et al. | |
| 6,617,046 B2 | 9/2003 | Noro et al. | |
| 6,858,659 B2 | 2/2005 | White et al. | |
| 7,045,562 B2 | 5/2006 | Thiel et al. | |
| 8,993,066 B2* | 3/2015 | Yang et al. | 427/386 |
| 2002/0193040 A1* | 12/2002 | Zhou | 445/51 |
| 2004/0055686 A1 | 3/2004 | Cowger et al. | |
| 2004/0076681 A1* | 4/2004 | Dennis et al. | 424/489 |
| 2004/0177451 A1* | 9/2004 | Poulin et al. | 8/115.51 |
| 2005/0038173 A1* | 2/2005 | Harris et al. | 524/495 |
| 2005/0272856 A1* | 12/2005 | Cooper et al. | 524/496 |
| 2006/0166003 A1* | 7/2006 | Khabashesku et al. | 428/413 |
| 2007/0087198 A1* | 4/2007 | Dry | 428/408 |
| 2007/0292459 A1* | 12/2007 | Cooper et al. | 424/401 |
| 2009/0036568 A1 | 2/2009 | Merle | |
| 2009/0098299 A1* | 4/2009 | Cheng | 427/384 |
| 2009/0202644 A1* | 8/2009 | Gogotsi et al. | 424/489 |
| 2009/0224435 A1* | 9/2009 | Gogotsi et al. | 264/442 |
| 2010/0255279 A1* | 10/2010 | Hong | 428/217 |
| 2011/0033721 A1* | 2/2011 | Rohatgi | 428/548 |

OTHER PUBLICATIONS

Naguib ("Filling and chemical modification of carbon nanotubes with polymers." Paper 490 presented at the 226th ACS National Meeting, Sep. 7-11, 2003).*

"Occuptional Safety and Health Guideline for Ethylidene Norbornene." US Department of Health and Human Services, 1995, pp. 1-8.

"3M Fluorinert Liquids." Issued Dec. 2003, pp. 1-4.

Lee et al., "Characterization of Dicyclopentadience and 5-ethylidene-2-norbornene as Self-Healing Agents for Polymer Composite and its Microcapsules." Sep. 3, 2004, pp. 478-483.

Solvents. O=Chem Directory. http://www.usm.maine.edu/~newton/Chy251_253/Lectures/Solvents/Solvents.html, pp. 1-4.

White et al., "Autonomic healing of polymer composites", letters to nature, 2001, Feb. 15, 2001, pp. 794-797 (2001), Nature vol. 409.

E.N. Brown et al., "In Situ (urea-formaldehyde) microencapsulation of dicyclopentadience", Journal of Microencapsulation, pp. 1-14 plus List of Recent TAM Reports.

Brown et al., "Fracture and fatigue behavior of a self-healing polymer composite", Materials Research Society Symposium Proceedings, CAPLUS accession No. 2003:466302, 2003, abstract.

Kessler et al., "Self-healing structural composite materials", Composites, Part A: Applied Science and Manufacturing, CAPLUS accession No. 2003:595414, 2003, abstract.

Sakurai, "Polymeric materials having autonomic healing properties", Kagaku to Kogyo, CAPLUS accession No. 2002:175108, 2001, vol. 54, No. 11, abstract. [Cited in U.S. Pat. No. 7,045,562].

* cited by examiner

SELF-HEALING POLYMER COMPOSITIONS

This application claims priority to the provisional application under U.S. Ser. No. 61/451,131, entitled SELF-HEALING POLYMER COMPOSITIONS, filed Mar. 18, 2011, which is incorporated herein by reference.

I. BACKGROUND OF THE INVENTION

A. Field of Invention

This invention pertains to a composition that can be used to heal cracks in plastics and other substrates. This invention also pertains to a method of preparing a composition for healing cracks in plastics and other substrates.

B. Description of the Related Art

Cracks are detrimental to plastics, rubber, ceramics, coatings, metals, and/or concrete. Cracking may range from merely cosmetic to detrimental. The mechanisms behind cracking may vary from stress, fatigue, mechanical degradation, environmental factors, chemical factors, and several others. When a susceptible material is subjected to at least one of these mechanisms, cracking may occur. Because of the wide range of these mechanisms, it may be difficult to anticipate and address the cracking before it is apparent.

Cracks are first nanosized, and visually unobservable. Gradually, they will get larger. Crack formation may decrease the strength of a material. The cracks may then lead to deeper cracks and even corrosion issues. Crack formation may also diminish the corrosion prevention of a material. Besides the damaging effects of cracks, they are also visually undesirable. Despite quality materials, cracks will eventually be formed.

What is needed is a way to repair cracking once is has occurred without compromising the integrity of the material. Ideally, what is needed is a composition in which the material can self-heal before cracks may be visually detected. The present invention provides a composition that can be used to heal cracks and a method for the preparation of the composition.

II. SUMMARY OF THE INVENTION

Accordingly, it is an object of the present invention to provide a composition for healing cracks in a substrate comprising nanotubes; at least one healing agent inside the nanotubes; and end caps bound onto both ends of the nanotubes.

One object of the present invention is that cracks may be healed for a substrate comprised of plastic, rubber, ceramic, coating, metal, and/or concrete.

Another object of the present invention is that the nanotube comprises carbon nanotubes.

Yet another object of the present invention is that the carbon nanotubes are single walled, double walled, and/or multiwalled.

Still another object of the present invention is that the carbon nanotubes are functionalized.

Still yet another object of the present invention is that the nanotube comprises inorganic nanotubes.

One object of the present invention is that at least one healing agent is released from the nanotubes for filling cracks in a substrate.

Another object of the present invention is that a healing agent comprises diisocyanates, polyisocyanates, dialcohols, and/or polyalcohols.

Yet another object of the present invention is that a healing agent is liquid.

Still another object of the present invention is that the healing groups of at least one healing agent are chemically protected.

Still yet another object of the present invention is that end caps comprise polymers and/or nanoparticles.

Another object of the present invention is that end caps comprise polyallylamine, polylysine, aminodendrimer, aminofunctionalized polystyrene, and/or polyacrylate nanoparticles.

One object of the present invention is that it provides a means for removing the end caps and releasing the healing agent(s).

Another object of the present invention is that it provides a means for filling cracks in a substrate.

Another object of the present invention is that it further comprises silicon carbide whiskers.

Still another object of the present invention is that it further comprises graphite fiber.

Still yet another object of the present invention is that it further comprises nanoparticles.

Yet another object of the present invention is that it further comprises nanoparticles with zinc, aluminum, magnesium, and/or silver.

One object of the present invention is a method for producing the composition for healing cracks comprising nanotubes, healing agent(s) inside the nanotubes, and end caps bound onto both ends of the nanotubes. The method comprises the steps of filling nanotubes with healing agent(s) and binding end caps onto both ends of the nanotubes wherein the healing agent(s) is released from the nanotubes for filling cracks in a substrate.

Still another object of the present invention further comprises filling the healing agent(s) inside the nanotubes under vacuum.

Yet another object of the present invention further comprises removing the end caps and releasing the healing agent(s).

Still yet another object of the present invention is that the end caps are removed by a hydrolysis reaction.

Another object of the present invention is the self-healing of cracks in plastic, rubber, ceramic, coating, metal, and/or concrete.

Still another object of the present invention is that it is easy to incorporate into a substrate.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DETAILED DESCRIPTION OF THE INVENTION

Figure 1:
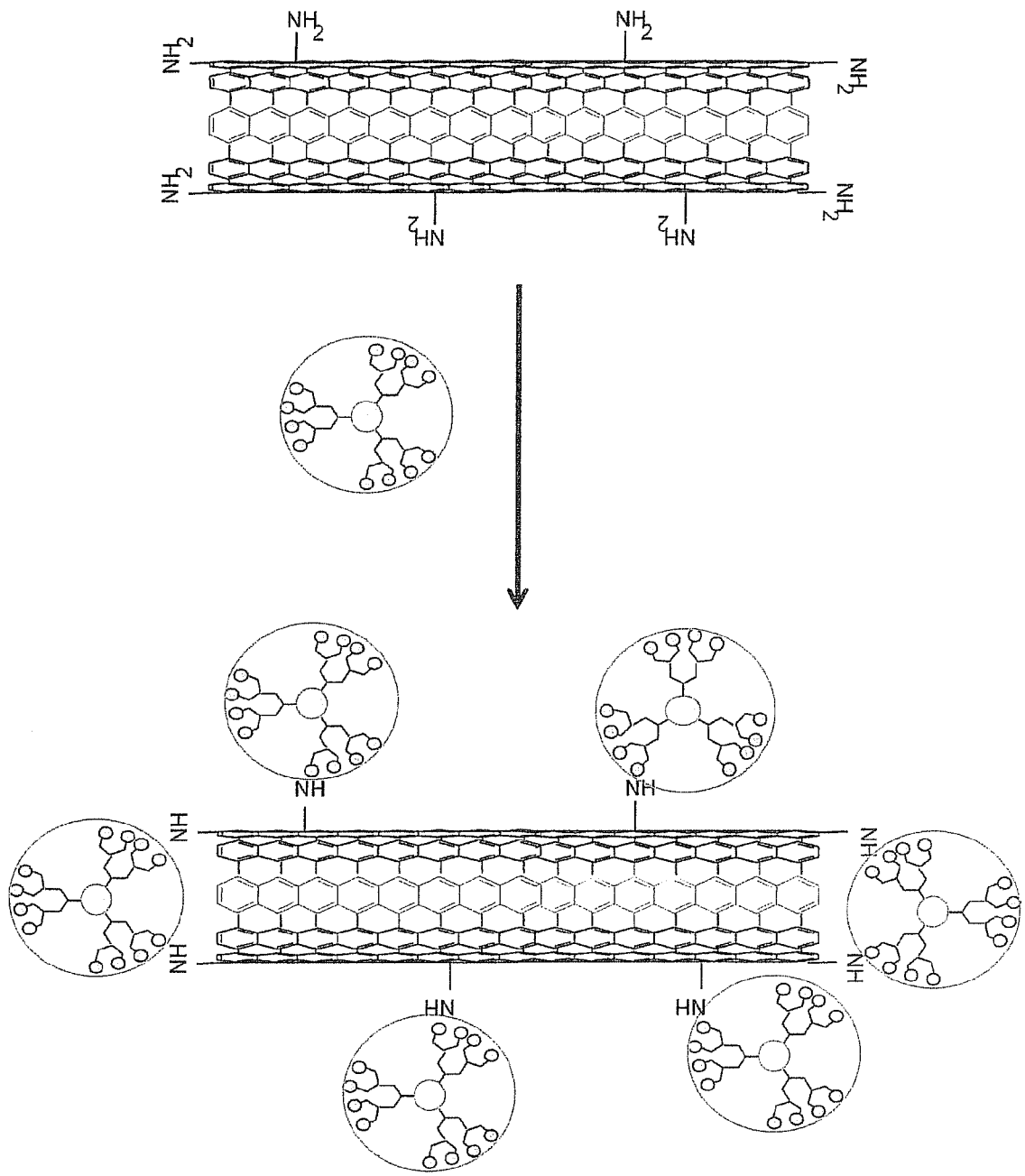
FIG. 1 is a schematic representation of preparing a composition for healing cracks in plastics and other substrates.

Referring now to the drawings wherein the showings are for purposes of illustrating embodiments of the invention only and not for purposes of limiting the same.

FIG. 1 shows a process for making a chemical composition for healing cracks comprising of nanotubes, at least one healing agent inside the nanotubes, and end caps, which are bound onto both ends of the nanotubes. With the chemical composition for healing cracks, the healing agent(s) can be released from the nanotubes in order to fill the cracks of various substrates. The healing agent(s) may then be released after a reaction to remove the end caps has occurred.

Crack formation may be prevented, at least partially, by strong nanofibers into a plastic or other substrate. The compositions presented herein may fill these cracks and provide barrier protection against water and/or oxygen, which may further propagate the cracks. These nanofibers may provide a means to release chemical compositions which may self-heal various substrates when cracks begin to occur. These substrates may include plastics, rubber, coatings, ceramics, metals, and/or concrete. The substrate may be structural or used as a coating. If the substrate is a plastic, it may thermoplastic or thermoset. If it is a coating, the compositions described herein may be used in more demanding coatings applications such as oil pipes, chemical containers, and/or marine applications. With the application in coatings, the coating formulation may contain sacrificial metal particles such as zinc and/or nickel as anticorrosive agents. Nanofibers may include carbon nanotubes (CNTs) and/or inorganic nanotubes (INTs). These nanofibers provide a vessel in which the healing agent may be held until they are needed to fill these crack in the substrate.

The CNTs may be single walled, double walled, or multiwalled in their layers. Among the CNTs, the multiwalled nanotubes may have a larger volume, which may help them to hold more of the healing agents. The single walled CNTs may hold less healing agent than the multiwalled CNTs. These CNTs may have excellent strength, hardness, kinetic properties, and thermal properties. For the invention, CNTs can also have different chiralities and/or can be functionalized by several methods. For example, the CNTs may be functionalized by amino groups and/or epoxy groups.

Inorganic nanotubes may be used an alternative or in combination with CNTs. INTs are cylindrical molecules comprised of metal oxides. These INTs can provide high crystallinity, good uniformity and dispersion, needle-like morphology, good adhesion to a number of polymers, and high impact-resistance.

Additionally, silicon carbide whiskers may also be used in addition to CNTs and/or INTs. The silicon carbide whiskers may provide strength. The silicon carbide whiskers may also be functionalized, for example by amino groups and/or epoxy groups.

Graphite fiber may also be added for increased tensile strength. The graphite fiber may help to form a stronger composite or hybrid material into various matrix substrates.

With the nanotubes, they may be dispersed well within the substrate. If the nanotubes are not dispersed well within the substrate and/or are not connected with the polymer matrix of the substrate, the nanotubes may glide within the substrate, which may diminish their ability to enforce the polymer matrix, and/or the healing agent(s) may not be released when a crack(s) is formed. Thus, connecting the nanotubes with the polymer matrix of the substrate can improve its effectiveness in healing the crack(s).

Healing agent(s) inside of the nanotubes may be used to fill the cracks and provide healing to a variety of substrates. The healing agent(s) can provide a permanent means by which a substrate can be repaired. In the present invention, one or more healing agents may be used inside the nanotubes. For example, molecular isocyanate and/or silylated alcohol may be used. In one example, only one healing agent may be used in a nanotube. Alternatively, more than one healing agent may be used in a nanotube; however, there may be an interaction with another healing agent(s). In order to prevent premature reaction, at least one healing agent may be capped with protective group(s). For instance, a polyol may be protected by trialkyl silyl groups before it is mixed with diisocyanate. The mixture can be stable until it gets contact with water, and silyl groups may then be hydrolyzed fast. The hydroxyl groups may then be exposed, and can react with isocyano groups forming polyurethane.

Each nanotube may contain one type of healing agent or a plurality of healing agents within each nanotube. Further, there may be a mixture of nanotubes in which one type of healing agent can be used inside some nanotubes and at least one other healing agent used inside other nanotubes. Healing agent(s) may include diisocyanates, polyisocyanates, dialcohols, and/or polyalcohols, which can form polyurethanes. Other healing agent(s) may also include diamines and/or glycolcarbonate, which also can form polyurethanes. Other healing agent alternatives can include epoxies and diamines. For example, the healing agent(s) may be aminofunctionalized where amino groups can be on the surface of CNTs that contain diisocyanate which may react with the diisocyanate when the CNTs are filled with the healing agent(s). The healing agents may be chemically protected.

The healing agent(s) may be filled into the nanotubes under vacuum. Using this method, the nanotubes may be placed into a container that can be evacuated. At least one healing agent may then be added such that the nanotube is covered. Once air or some other gas may be allowed into the container, the nanotubes can be filled with the healing agent. The mixture with the nanotubes filled with the healing agent(s) may then be filtered and washed without removing the healing agent(s) from the nanotubes. The filtering and washing may be done using a minimal amount of inert solvent.

Healing agents may be a liquid at the temperature at which they will be used so that they may flow into crack(s) to fill them. The use of an elevated temperature may be possible if the healing agent is a solid at ambient temperature or a solid in the substrate's environment. A healing agent(s) may also be dissolved in inert solvent in order to fill the nanotubes. After the filling, the nanotubes may be capped with the end caps. If the ends of the nanotubes are not capped, the healing agent(s) may leak out prematurely.

After the healing agent(s) can be released from the nanotubes, the healing agent(s) may solidify as a result of at least one reaction. This reaction may be as a result of interactions with water, oxygen, another healing agent(s), and/or another material. If the healing agent(s) do solidify after they are released from the nanotube, the volume of the resulting solid may be advantageously larger than that of the fluid form of the healing agent(s). This larger volume from the resulting solid may aid in filling the crack(s).

Once the healing agent(s) are released, they may then work to heal the crack(s) within the substrate. The healing agent(s) may be released in a variety of ways. First, when a crack is formed, the nanotubes may be cut at the crack site and/or the end caps, which may depend on the width of the end caps, such that the healing agent(s) can be released. Second, the nanotubes containing the healing agent(s) and the bound end caps may undergo a reaction such that the end caps are removed, allowing for the release of the healing agent(s). For the second case, this reaction may be as a result of interactions with water. In order to trigger the mechanism for releasing the healing agent, water may penetrate into the crack(s) of the substrate. For example, if the crack is formed in a humid environment or underwater, some water may penetrate through the cracks and into the nanotubes. Here, silyl groups may be removed by hydrolysis and excess water may be consumed. Then, some water may react with isocyanate compound, releasing carbon dioxide. This carbon dioxide may act to push the healing agent(s) out of the nanotubes. The carbon dioxide can also create bubbles in within the polyurethane formed from the healing agent(s). Also, some hydrolyzed silyl groups may polymerize, forming siloxanes.

After the nanotubes are filled with the healing agent(s), end caps may then be bound onto the ends of the nanotubes. This capping can be done with polymers and/or nanoparticles that may contain multiple amino and/or hydroxyl groups. Some examples of these amino and/or hydroxyl groups may be polyallylamine, polylysine, aminodendrimer, aminofunctionalized polystyrene, and/or polyacrylate nanoparticles. These end caps may be bound with multiple bonds onto both ends of the nanotubes. They can also be on the sidewalls of the nanotubes. Additionally, the polymers and/or nanoparticles can remain free within the composition. If the polymers and/or nanoparticles are free, then they may be able to react with other chemicals within the composition. For example, amino groups may remain free and can bind with epoxy resin if the CNTs can be incorporated into the epoxy. This capping process may be illustrated by FIG. 1.

Additionally, a second functionalization may be done within the composition. For example, second amino functionalized CNTs may be filled with dialcohol and/or polyalcohols that may have amino groups on the surface after the filling process. In another example, polyamino particles may be used to cap the first CNTs may be reacted with diisocyanate, leaving one cyanate group free, and then the polyamino particles can bind with the amino groups at both ends and on the surface of the second CNTs. This reaction is also depicted in FIG. 1.

Along with the composition described herein, other microparticles and/or nanoparticles may also be added. The microparticles and/or nanoparticles may be filled with healing agents. The composition of the nanoparticles may contain metallic nanoparticles such as zinc, aluminum, magnesium, and/or silver. These metallic nanoparticles may provide a passive sacrificial galvanic protection against corrosion. These metallic nanoparticles may also offer electromagnetic interference (EMI) shielding, which may provide "immunity" for electronic components that are susceptible to EMI and prevents the same components from transmitting excessive interference to their surrounding environment.

Figure 2:
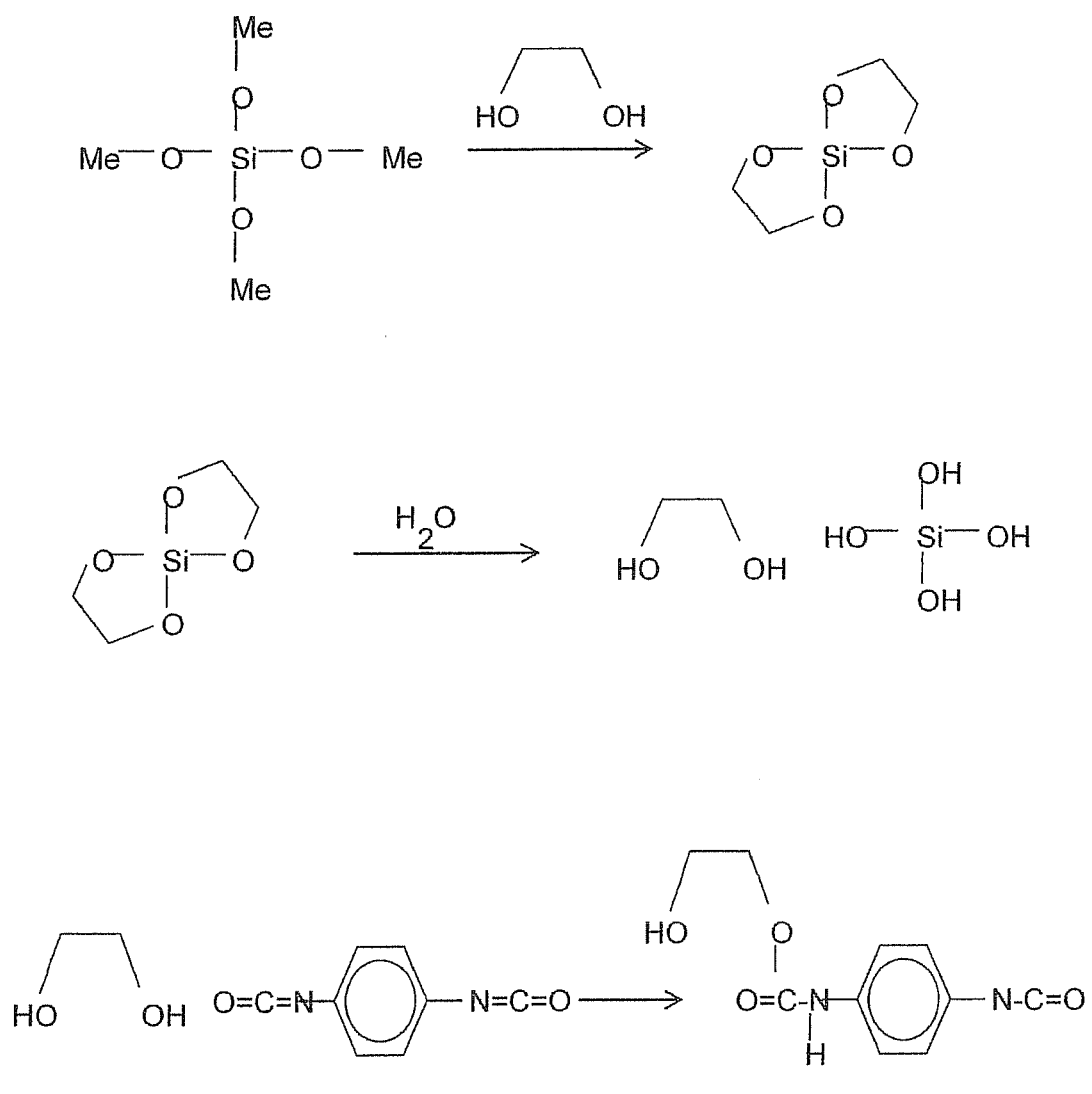
FIG. 2 is a schematic representation of some potential reactions of the present invention.

FIG. 2 depicts the use of difunctional compounds within the composition. If difunctional compounds are used, then the stoichiometry can be a factor in the length of the polymer chains. If multifunctional monomers are used, then the stoichiometry may not be as critical. For instance, if in a three-dimensional monomer one functional group does not react, or reacts with water, the remaining two functional groups can still form a polymer chain.

However, compositions with more than one healing agent may have healing agents that may leak out at different rates, or be unevenly distributed. This may be a desirable property for certain types of compositions. If it is not desired, then it may be prevented or at least reduced if one or both of the healing agents can be chemically protected and the protecting group is cleaved by water, oxygen, and/or light. For example, if a polyurethane healing agent is used, then the alcohol may be protected by silyl groups. With the protection from the silyl groups, viscosity may be reduced, miscibility with isocyanate components may be improved, solid polyalcohols can have liquid silyl derivatives, and/or an excess of water can be consumed by the hydrolysis of the silyl groups. For instance, silylated glycerol and/or glucose may be used. Protecting silyl groups may be, as shown in FIG. 2, trimethyl silyl, dimethyl phenyl silyl, and/or methyl ethylenedioxy silyl. These protected polyalcohols may be mixed with isocyanates and filled into the nanotubes. After capping these nanotubes, the composition may be added to a substrate like plastic.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A composition for healing cracks in an associated substrate comprising:
    carbon nanotubes;
    at least two healing agents inside said nanotobes, wherein one of said healing agents is a polyol and one of said healing agents is an isocyanate, wherein a functional group of said polyol agents is chemically protected by a silyl group, wherein said silyl group is capable of being removed by hydrolysis; and
    end caps bound onto both ends of said nanotubes, wherein both end caps are closed.

2. The composition of claim 1, wherein said associated substrate comprises at least one substrate of plastic, rubber, ceramic, coating, metal, and concrete.

3. The composition of claim 1, wherein said carbon nanotubes are at least one layer of a single walled layer, a double walled layer, and a multiwalled layer.

4. The composition of claim 1, wherein said carbon nanotubes are functionalized.

5. The composition of claim 1, wherein said at least two healing agents are releasable from said nanotubes for filling said cracks in said associated substrate.

6. The composition of claim 1, wherein said isocyanate is a diisocynate or a polyisocyanate, and said polyol is a dialcohol or a polyalcohol.

7. The composition of claim 1, wherein said at least two healing agents are liquid.

8. The composition of claim 1, wherein said end caps comprise polymers.

9. The composition of claim 1, wherein said end caps comprise nanoparticles.

10. The composition of claim 1, wherein said end caps comprise at least one chemical of polyallylamine, polylysine, aminodendrimer, aminofunctionalized polystyrene, and polyacrylate nanoparticles.

11. The composition of claim 1, further comprising a means for removing said end caps and releasing said healing agents.

12. The composition of claim 1, further comprising silicon carbide whiskers.

13. The composition of claim 1, further comprising graphite fiber.

14. The composition of claim 1, further comprising nanoparticles.

15. The composition of claim 14, wherein said nanoparticles comprise at least one metal of zinc, aluminum, magnesium, and silver.

16. The composition of claim 14, wherein said nanoparticles provide protection against electromagnetic interference.

17. The composition of claim 1, wherein said composition is incorporated into said substrate.

18. A chemical composition for healing cracks in an associated substrate, said composition comprising:
- carbon nanotubes;
- at least two healing agents inside said carbon nanotubes, wherein said at least two healing agents are polyisocyanates and polyalcohols, wherein a functional group of said polyalcohol is chemically protected by a silyl group; and
- end caps comprising at least one chemical of polyallylamine, polylysine, aminodendrimer, aminofunctionalized polystyrene, and polyacrylate nanoparticles bound onto both ends of said carbon nanotubes, wherein both end caps its are closed, wherein said healing agents are released for filling said cracks in said associated substrate.

* * * * *